Oct. 8, 1935.    J. W. BRYCE    2,016,705
AUTOMATIC CARD PUNCH
Original Filed Oct. 23, 1930    7 Sheets-Sheet 1

INVENTOR
James W. Bryce
BY
ATTORNEY

Oct. 8, 1935.　　　J. W. BRYCE　　　2,016,705
AUTOMATIC CARD PUNCH
Original Filed Oct. 23, 1930　　7 Sheets-Sheet 2

Oct. 8, 1935.  J. W. BRYCE  2,016,705
AUTOMATIC CARD PUNCH
Original Filed Oct. 23, 1930   7 Sheets-Sheet 3

INVENTOR
James W. Bryce
ATTORNEY

Oct. 8, 1935.    J. W. BRYCE    2,016,705
AUTOMATIC CARD PUNCH
Original Filed Oct. 23, 1930    7 Sheets-Sheet 4

INVENTOR
James W. Bryce
BY
ATTORNEY

Oct. 8, 1935.                J. W. BRYCE                2,016,705
                         AUTOMATIC CARD PUNCH
                  Original Filed Oct. 23, 1930    7 Sheets-Sheet 5
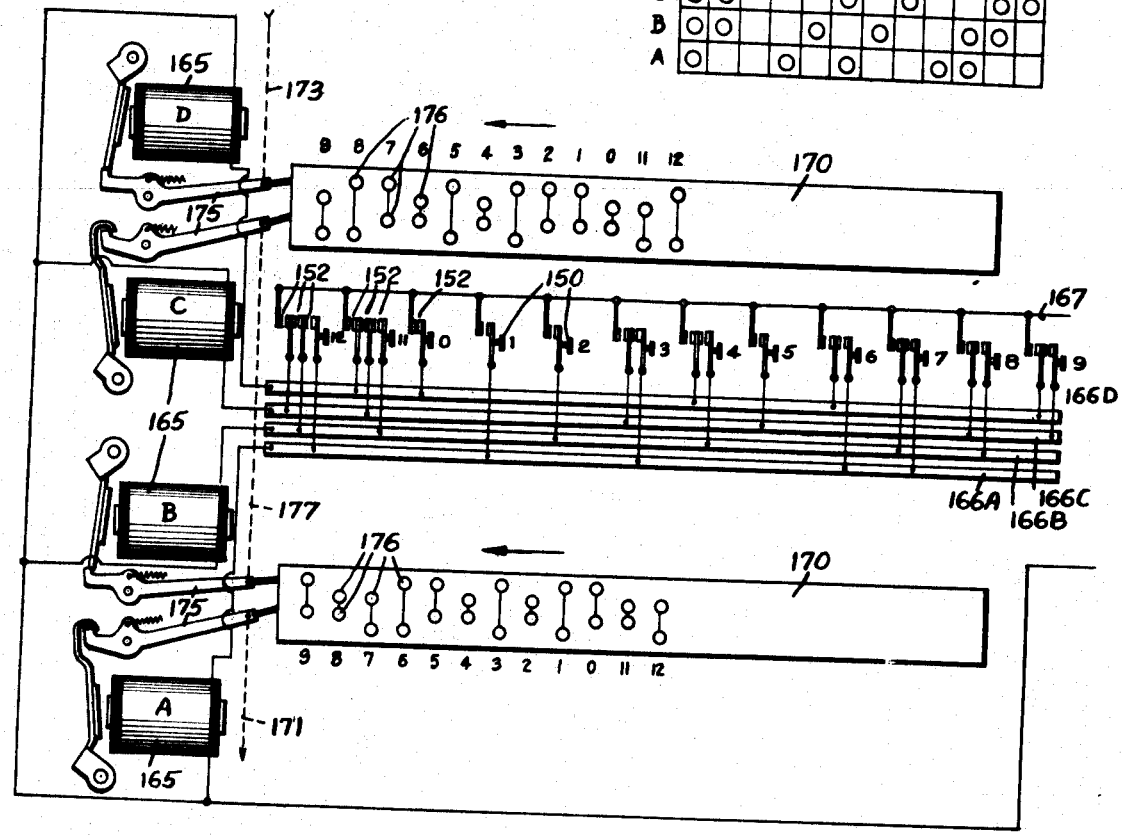
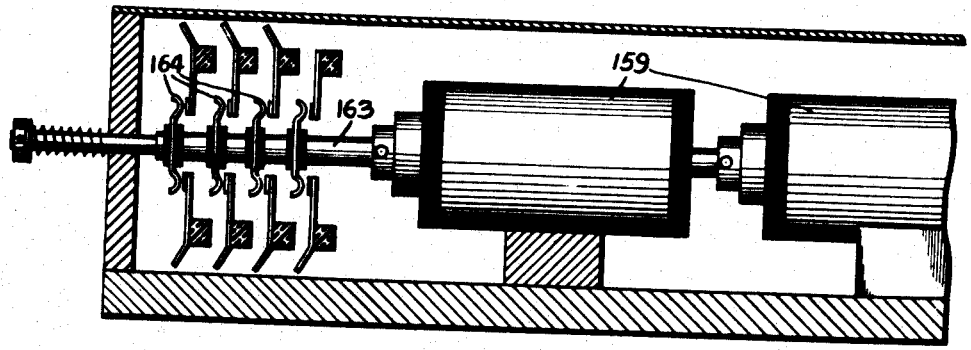

Oct. 8, 1935.   J. W. BRYCE   2,016,705
AUTOMATIC CARD PUNCH
Original Filed Oct. 23, 1930   7 Sheets-Sheet 6

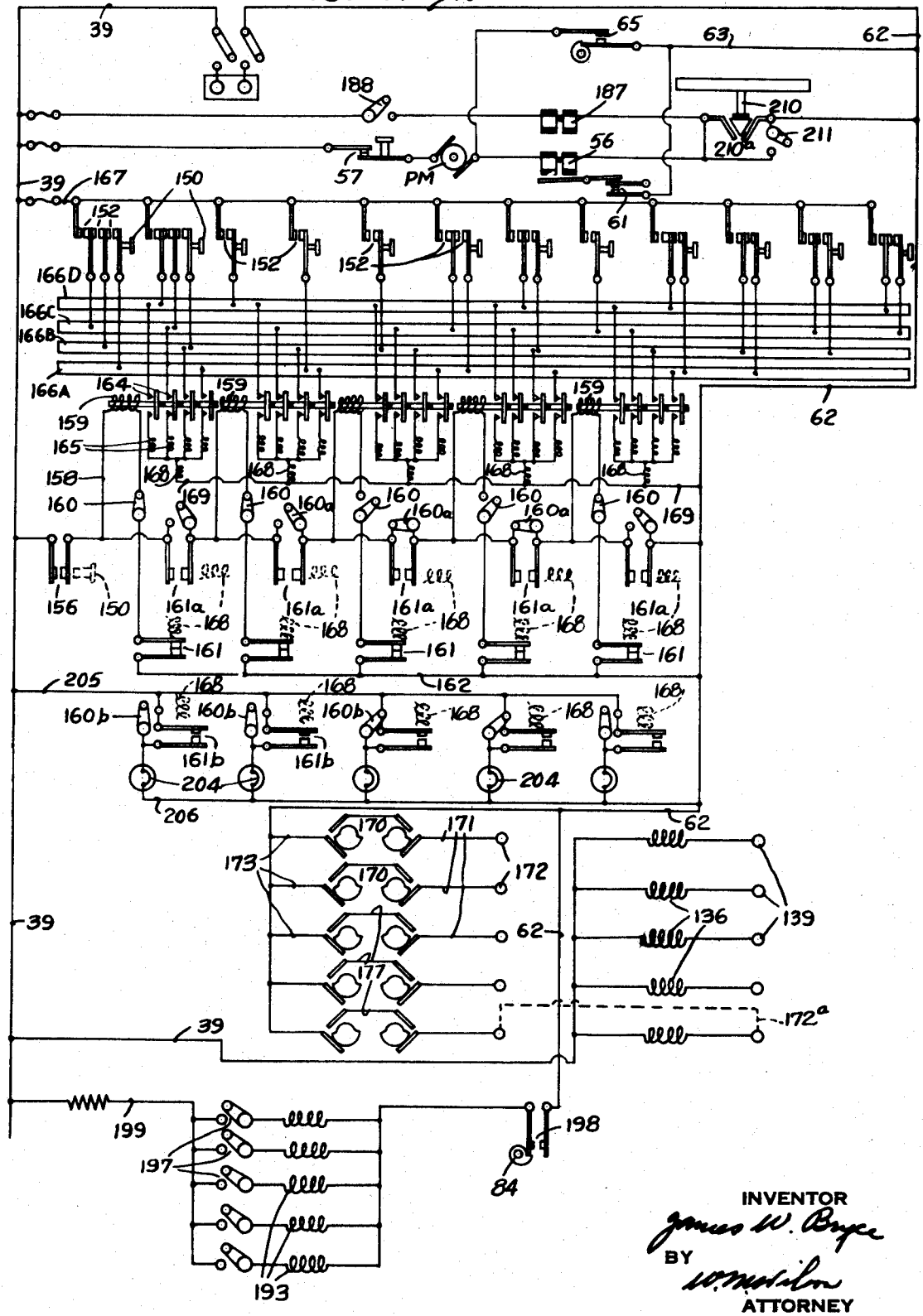

Patented Oct. 8, 1935

2,016,705

UNITED STATES PATENT OFFICE 2,016,705

AUTOMATIC CARD PUNCH

James W. Bryce, Bloomfield, N. J., assignor, by mesne assignments, to International Business Machines Corporation, New York, N. Y., a corporation of New York Original application October 23, 1930, Serial No. 490,641. Divided and this application June 28, 1932, Serial No. 619,709

19 Claims. (Cl. 164—113)

This invention concerns record perforating machines and is a division of the copending application Serial No. 490,641, filed October 23, 1930.

One object of the invention is to provide a perforator utilizing key-set storage mechanism in which data may be set and retained, said storage mechanism being designed to control the operation of the perforator.

Another object is to construct a punching machine having a data receiving device in which items are set up column by column by key depression and from which device the items are simultaneously emitted as timed electric impulses to control the operation of the punches.

Another object is to provide in a key-set perforating machine, adapted to be set column by column, novel electric column skipping mechanism whereby certain predetermined columns will be automatically skipped and no setting will be made therein. Novel indicating devices are also provided to indicate which columns have been set and in which column the next key depression will cause a set-up to be made.

A further object resides in the provision of means for causing the setup mechanism to retain its setting so that repetition punching may be effected thereby.

A further object resides in the provision of means for effecting continuous operation of the machine to repeatedly punch the same data in a succession of cards.

Further objects of the present invention will be hereinafter pointed out in the accompanying specification and claims and shown in the drawings which by way of illustration show a preferred embodiment of the invention.

In the drawings:

Fig. 8 is a diagram of the storage commutator code arrangement.

Fig. 9 is a diagrammatic wiring arrangement of the method of translating a key selection into a timed impulse.

Fig. 10 is a detail of a circuit controlling switch.

Fig. 14 is a wiring diagram of the electric circuit connections of the machine.

Punching mechanism

Figure 1:
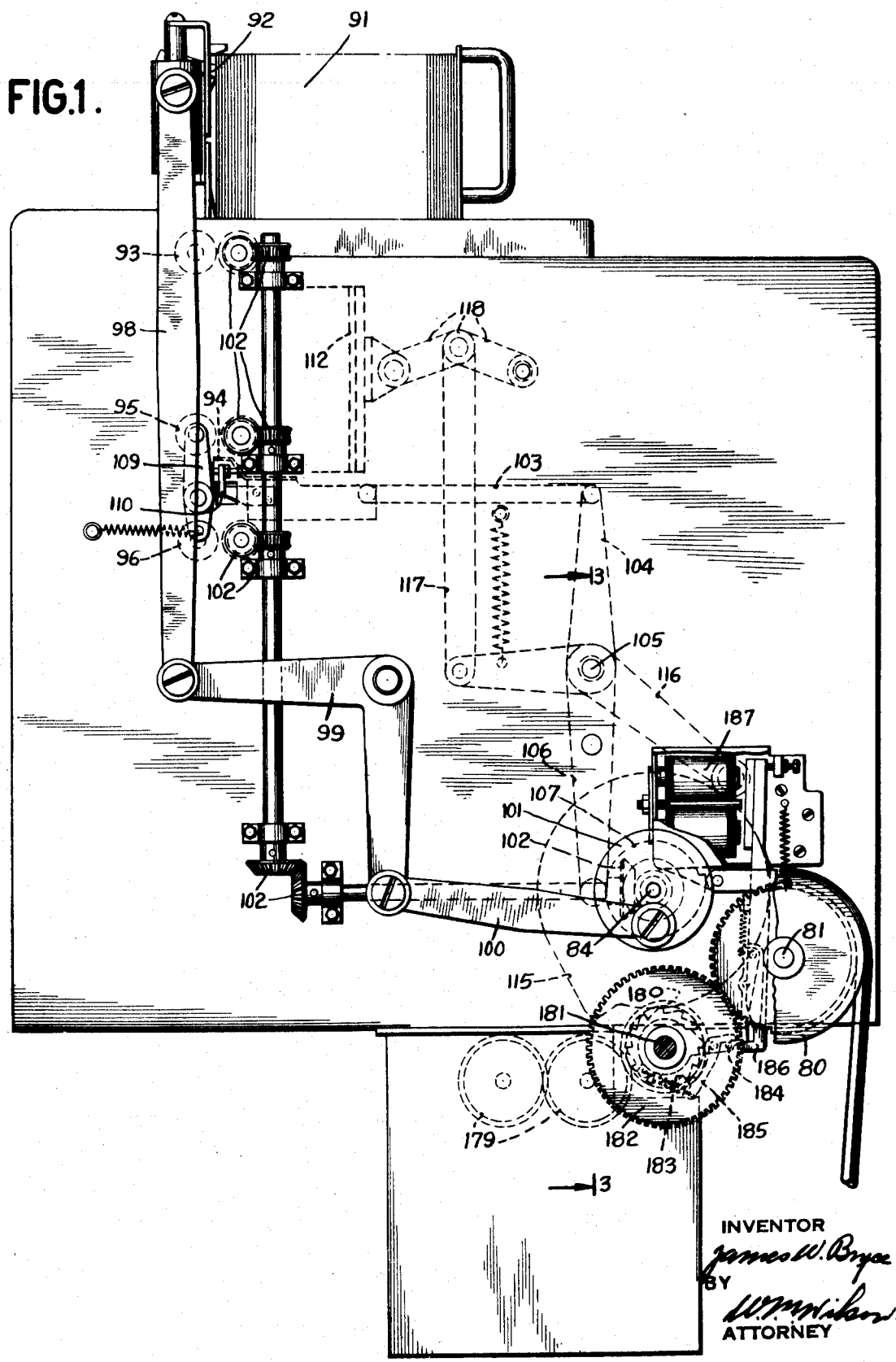
Fig. 1 is an outside view of the punching machine.

The operation of the punching mechanism will first be described. Referring to Figs. 1, 3, 4, and 13, motor PM has belt connection to a pulley 80 secured upon a shaft 81 upon whose opposite end is fastened a gear 82 driving a gear 83 loose on shaft 84. Attached to gear 83 is a clutch element 85 adapted to be engaged by a dog 86 carried by member 87 secured upon shaft 84. Energization of magnet 56 will rock armature 88 about its pivot and release dog 86. At the completion of a cycle, armature 88 will again engage member 87 and cause the withdrawal of dog 86 from element 85. The usual rebound latch 89 prevents retrograde movement of the parts. In this manner, shaft 84 is permitted to make one revolution each time magnet 56 is energized. A plunger 90, guided for vertical movement, is depressed by armature 88 when the magnet operates to close contacts 61.

Cards are fed singly from a hopper 91 (Figs. 2 and 4) by a picker knife 92 into the bight of rollers 93 which advance the card to punching position where its movement is interrupted by a card stop 94 and thus held in position until punched. Rollers 95 then engage the card, advancing it to rollers 96 which deliver it to discharge hopper 97.

Picker knife 92 is reciprocated once each cycle through link 98 (Fig. 1) connected to bell crank 99 pivoted on the side frame of the punch. A link 100 has one end attached to the bell crank 99 and the other to a disk 101 fast upon shaft 84 (see also Fig. 3). One of each pair of rollers 93, 95 and 96 is driven from shaft 84 by gearing generally shown at 102. Card stop 94 is mounted for horizontal movement into the path of the card and is connected by links 103 to arms 104 secured to shaft 105.

This shaft carries at its extremity a depending follower arm 106 cooperating with a cam 107 on shaft 84. A spring 108 keeps the follower in engagement with the cam. In Fig. 1 the roller 95 is shown as being carried by a spring pressed pivoted arm 109 which is abutted by an extension 110 of slider 94. In this manner the rollers 95 are caused to release the card when stop 94 is in position to interrupt its passage. Removal of stop 94 will permit the rollers 95 to reengage the card and feed it downwardly.

The structure of the punches and their manner of operation is not new and only such features of the mechanism as are essential to an understanding of the present invention will be described.

Figure 2:
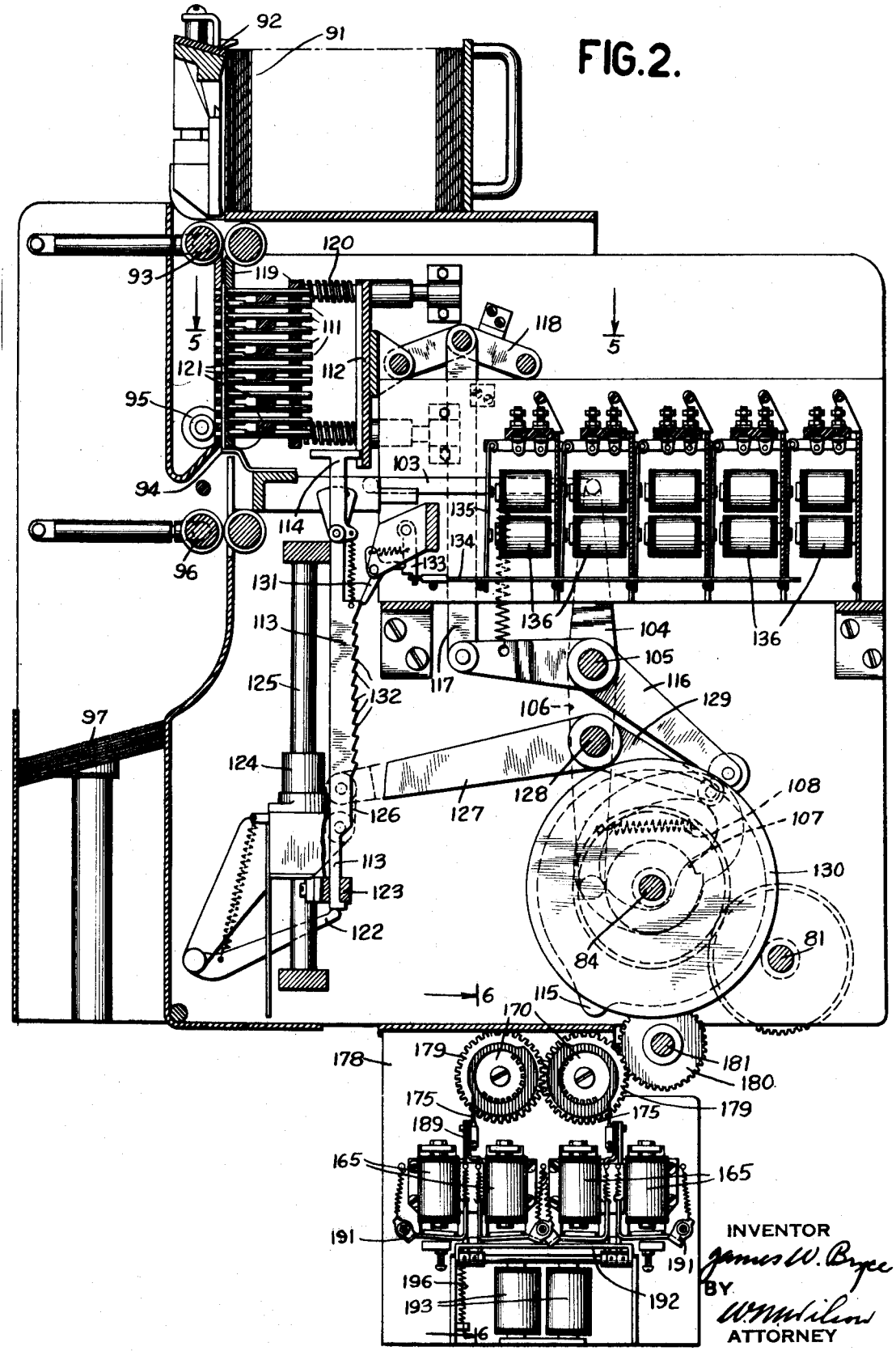
Fig. 2 is a central section through the punching machine.
Figure 5:
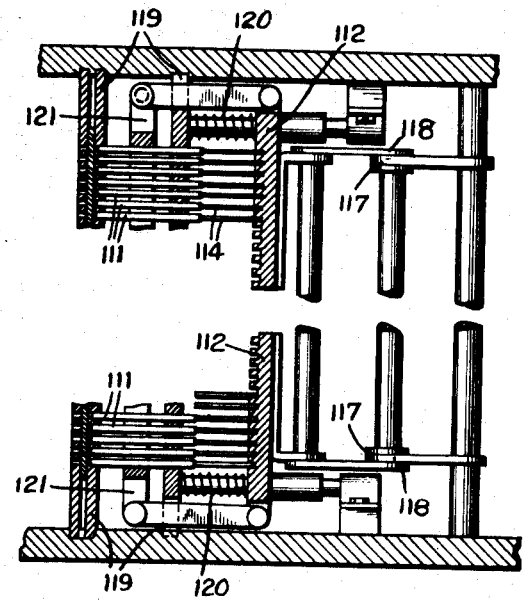
Fig. 5 is a section taken on the line 5—5 of Fig. 2.

A general understanding of the operation may be obtained from Fig. 2 and Fig. 5. The punches 111 are arranged in forty-five rows of twelve punches each, so spaced that when a record card is in position on stop 94 a punch will be in line with each index point position of the card including the two extra positions "eleven" and "twelve" sometimes used above the zero position. Each row of twelve punches corresponds to a card column. Behind the punches and spaced from them is a plate 112. Arranged to travel behind the punches and in front of the plate are forty-five selector bars 113, there being one for each card column. Each selector bar has a spring pressed T-shaped arm 114 and the function of the control devices is to position the heads of arms 114 behind the punches that are to be made effective.

On shaft 84 are cams 115 cooperating with spring pressed follower arms 116 connected by links 117 to toggle joints 118. Straightening of toggle 118 by downward movement of link 117 will move plate 112 to the left, pressing the heads of arms 114 which have been positioned, against punches 111 and advancing the punches through the card. The punches 111 are supported in fixed plates 119 between one of which and plate 112 are mounted springs 120 to assist in restoring the plate 112. A series of restoring bars 121 are connected to plate 112 and serve to positively retract the punches from the card.

The selector bars 113 are vertically slidable in suitable frame members and are normally drawn upward by spring pressed fingers 122. Such movement is prevented by a bail member 123 carried by a crosshead 124 which is slidably mounted on guides 125. The crosshead is adapted to be elevated by links 126 which connect with levers 127 secured on shaft 128 (see Figs. 2 and 3). An arm 129, also fast to shaft 128, has a follower roller riding in a groove in box cam 130 on shaft 84.

It will be understood that as the crosshead 124 rises all of the bars 113 are elevated in unison, bringing the heads of arms 114 into cooperation with successive horizontal rows of punches 111. To differentially determine the movement of the selector bars, pawls 131 are provided, which pawls cooperate with the ratchet teeth 132 in bars 113. The pawls are spring impelled into engagement with the ratchet teeth upon the tripping of a dog 133 one of which is provided for each pawl. The dogs are in turn actuated by call wires 134 which connect to the proper armatures 135 of the magnets 136.

*Key-set mechanism*

Provision is made in the form of commutator mechanism contained in the punching machine, for controlling the selector bars 113. Preferably this mechanism consists generally of a key bank and a commutator device comprising forty-five similar units the latter of which include what will hereinafter be referred to as the reading-out commutator.

Items are entered into the several orders or units of the device, column by column in the value represented by the particular key depressed and successive key depressions will enter the items in successive units of the device. Whenever a key is depressed, circuits are closed which include an electromagnet for shifting an individual brush associated with the reading-out commutator. One or more such circuits are closed by a single key and a system of coding, whereby various combinational readings are entered into the device, is employed so that the number of devices required may be a minimum. In this wise, but two reading-out commutators and four associated brushes for each device are necessary to receive information from any one of twelve keys.

The function of the reading-out commutator is to translate the combinational readings delivered by the keys, into single, timed, electric impulses for operating the selector bars of the punching machine. Obviously this timing is coordinated with the drive of the selector bar crosshead and the setting of the cooperating brushes is accomplished with the machine at a standstill. The reading-out commutator is provided with two circumferential rows of contacts for each index position of the coding device and one of the shiftable brushes normally cooperates with one row but when shifted by its magnet cooperates with the other row. The contacts are limited to an angular portion of the commutator surface, leaving a blank portion to permit shifting of the brushes prior to their cooperation with the contacts.

The contacts on the reading-out commutator are also arranged in transverse rows corresponding to the angular positions of the commutator in which the operating impulses to manifest the several characters must occur. The adjacent contacts in the transverse rows are connected in pairs and each pair is adapted to bridge two of the shiftable brushes when the latter are in given positions.

The pairs of shiftable brushes are wired in series with the control magnets of the selector mechanism and serve to energize them whenever each pair is bridged at the same time. Thus if the "3" key is depressed, a shifting of a certain combination of brushes of the reading-out commutator is effected and the transverse rows of contacts on the latter are so arranged that they will bridge the several pairs of shiftable brushes only at that point in the punching machine cycle at which an impulse will manifest a "3" on the associated selector bar. Other digits are manifested in a similar manner.

Figure 4:
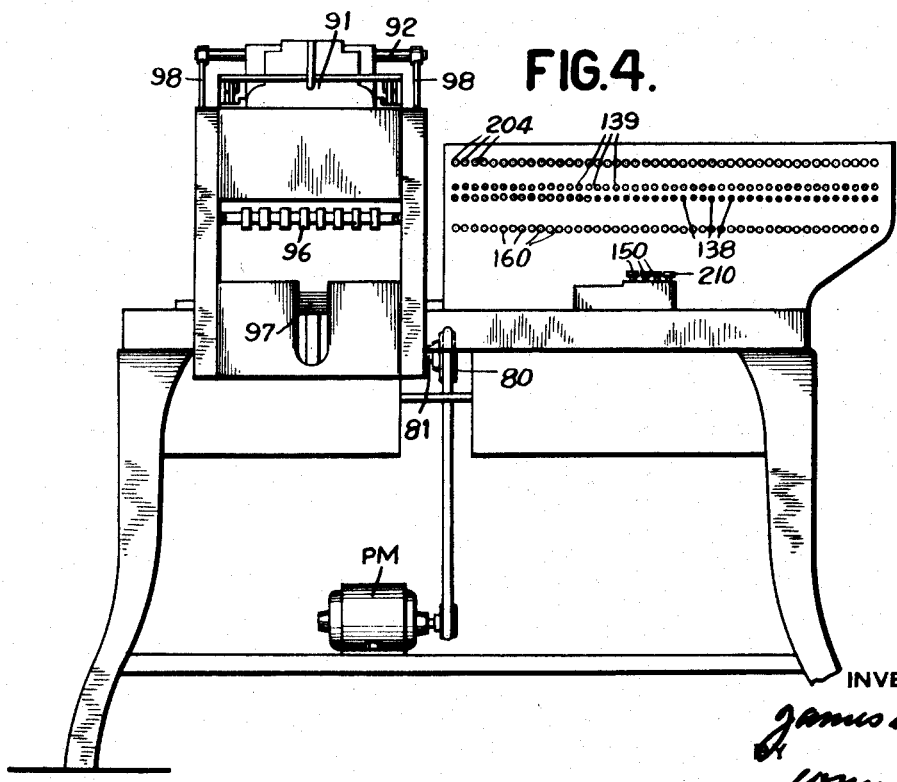
Fig. 4 is a front view of the punching machine and switch board.
Figure 11:
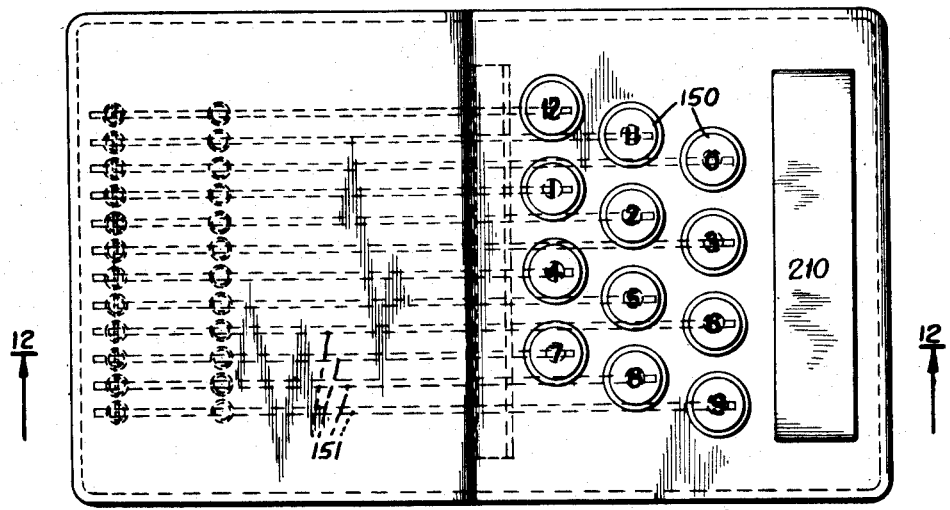
Fig. 11 is a plan view of the punch keyboard.
Figure 12:
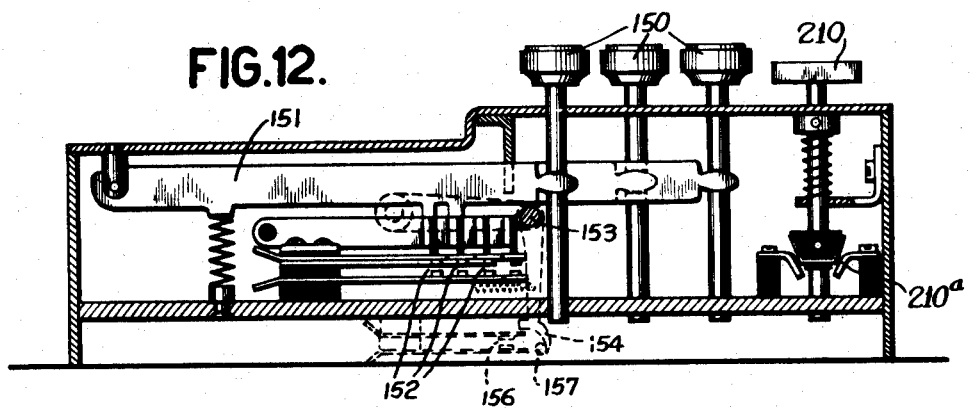
Fig. 12 is a section taken on line 12—12 of Fig. 11.
Figure 13:
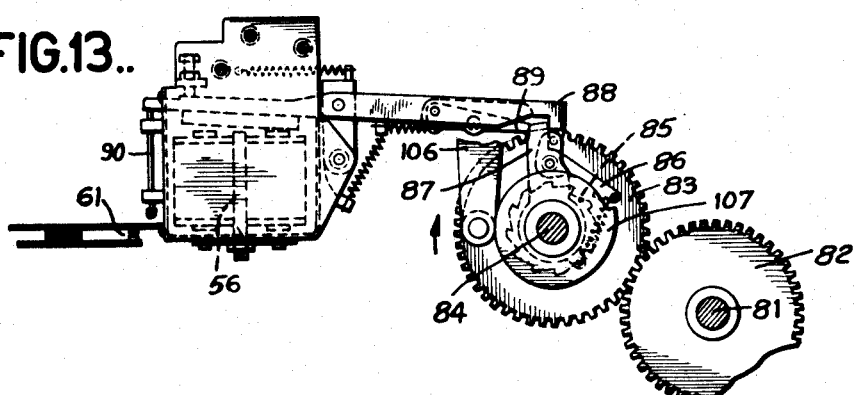
Fig. 13 is a detail section of the card feed clutch taken on line 13—13 of Fig. 3.

Figs. 4, 11 and 12 show the keys 150 adapted to operate spring pressed pivoted levers 151 to close one or more contacts 152 in accordance with the coding arrangement of Fig. 8, wherein each key character is represented by four index point positions identified as A, B, C, and D. For example, the character 4 is represented by perforations in the B and D positions; the character 5 is represented by a perforation in the C position and so on.

A bail 153 traversing all of the keys carries a finger 154 adapted, upon depression of any key 150, to close a contact 156. Continued depression of finger 154 will cause a cam surface at its free end to engage a pin 157 to cam the finger away from the contact thus permitting it to re-open.

Referring to Fig. 14 the depression of any key 150 by closing contact 156 will establish a circuit traced as follows: from line 39, contact 156, wire 158, the first solenoid 159 to the left, switch 160 now closed, relay contact 161 also closed, wire 162 and wire 62 to line 40. Energization of solenoid 159 (see Fig. 10) will attract its spring restrained plunger 163 to close a plurality of individual contacts 164 which, upon closure, connect a set of four magnets 165 to conductor bars 166A, 166B, 166C, 166D, connected in turn to contacts 152 in accordance with the code of Fig. 8.

If the first key 150 to the left has been depressed the following circuit will now be established: line 39, wire 167, the three contacts 152 of the first key to bars 166A, 166B and 166C, related contacts 164 and magnets 165, relay coil 168, wire 169 wire 62, to line 40. Since but a single solenoid 159 is energized for each key depression, only a single set of magnets 165 will be affected.

The translator mechanism comprises in addition to magnets 165, a reading-out commutator device 170. Its function is to convert one or more pulses which it may receive from the keys 150 into a single pulse which is applied through wire 171 to a plug socket 172, and thence through a suitable plug wire connection 172a to a socket 139 to a punch selector magnet 136. This circuit extends from line 40, wire 62, wire 173, reading-out commutator 170, wire 171, socket 172, connection 172a, socket 139 to magnet 136 to line 39.

The operation of the coding mechanism may be best understood from the development diagram of Fig. 9 which shows one of the forty-five units. The contacts 152 close circuits to magnets 165 through bars 166A—166D in a manner already described. Thus for example, if number 8 key is depressed, the corresponding B and C magnets 165 will be energized.

Each of the magnets 165 controls a shiftable brush 175, by means to be hereinafter described. When these magnets are deenergized, the brushes 175 are in positions indicated on the drawings, while if any magnet is energized, its corresponding brush is shifted to an alternate position. The brushes 175 ride on the surface of reading-out commutators 170, provided with a blank insulating surface which is opposite the brushes 175 during the setting of the keys. After they have been completely set up they coact with conducting spots 176 on the reading-out commutator surface. Two circumferential rows of spots 176 are provided for each brush 175, the brush coacting with the other row when it is shifted by its magnet. These spots are also arranged in transverse rows as indicated by the horizontal rows of numbers above the commutators corresponding to the punching machine positions in which impulses through the selector magnets will result in selecting the corresponding punches for operation.

The brush 175 associated with magnet D is connected through wire 173 to one side of the source of energy. The brushes 175 associated with magnets B and C are connected together by wire 177 and the brush of magnet A is connected through wire 171 to plug sockets 172 which may be connected to selector magnet 136. When the brushes 175 are in the position shown in Fig. 9 the passage of the spots 176 beneath them does not complete the selecting circuit. With the particular arrangement of the spots 176, however, if any member is selected by its key the brushes 175 will be shifted in combination to cause a current impulse through the selector magnet at the proper time to stop the selector in position adjacent to the punch position corresponding to such number.

The operation will be clearer from a specific example. Assume the "4" key to be depressed a circuit is instantaneously established from wire 167 to bars 166B and 166D and thence to magnets 165 of the B and D position and the corresponding brushes 175 will be shifted. By tracing the circuits in Fig. 9 it will be noted that with the B and D brushes shifted the selecting circuit is completed when, and only when, the row of conducting spots designated 4 is under the brushes 175, the brushes A and B and the brushes C and D being bridged at this time by the connected spots 176 on the commutator 170.

The other numbers represented by similar combinational key set-ups will result in selecting the punches in a similar manner.

Figure 3:
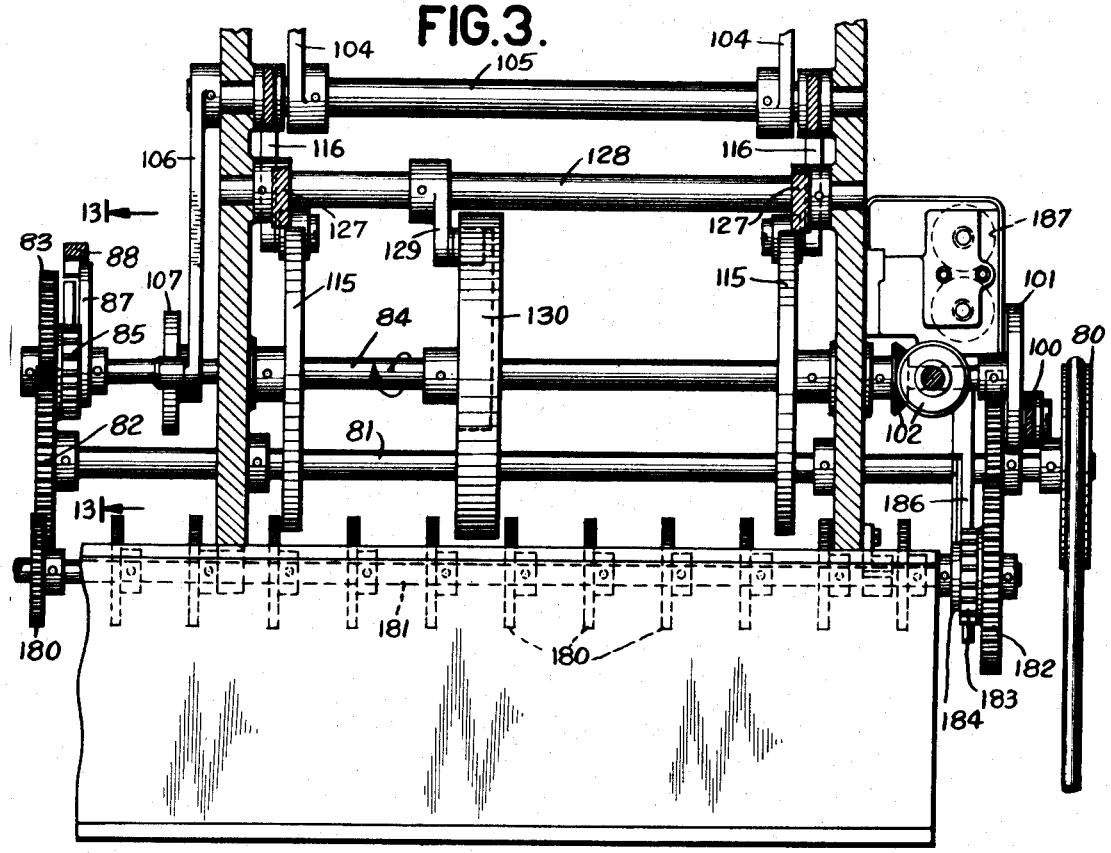
Fig. 3 is a section taken on line 3—3 of Fig. 1.
Figure 6:
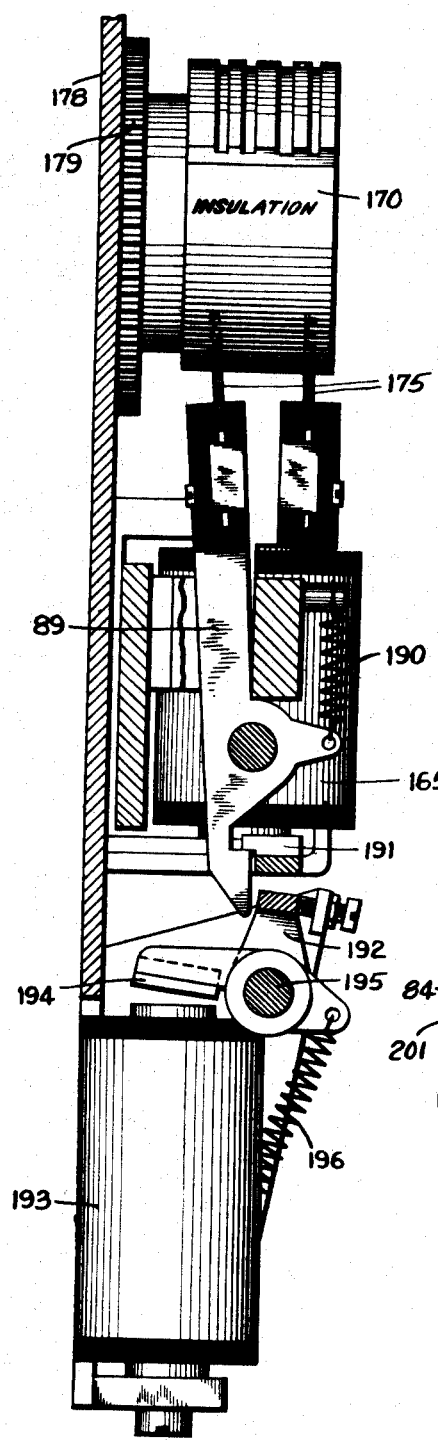
Fig. 6 is a section taken on line 6—6 of Fig. 2.

The general mechanical structure of one of the forty-five units of the commutator mechanism may be understood from Figs. 2 and 6 of the drawings in which the several elements of the unit are mounted on a common plate 178. Commutators 170 are mounted on gears 179 rotatable on studs in plate 178 and meshing with a gear 180 on shaft 181 which as shown in Figs. 1 and 3 has connection with pulley shaft 81 through a one revolution clutch similar to that used to operate the punching mechanism.

Gear 182 and clutch element 183 are loose on shaft 181 and are driven by a gear on shaft 81. A member 184 secured to shaft 181 carries the usual dog 185, released for engagement with element 183 by lever 186 upon energization of magnet 187. In the wiring diagram of Fig. 14, magnet 187 is wired in parallel with punch magnet 56 so that if switch 188 is closed both magnets will be simultaneously energized through parallel circuits to be traced later.

In Figs. 2 and 6 each brush 175, of which there are two for each commutator, is supported on and insulated from a pivot lever 189 which is urged toward its alternate position by a spring 190. The lever 189 is normally held against the action of the spring 190 by a spring pressed pivoted latch 191 controlled by magnet 165. Whenever the magnet is energized it attracts its armature latch 191 and rocks it to the position of Fig. 6 freeing the lower end of lever 189 and permitting spring 190 to move the lever to its alternate position. A single commutator provides for two brushes 175 the second being offset as in Fig. 6 to cooperate with its own associated columns of contacts. A bail 192 extending across the lower extremity of levers 189 serves to restore the levers to latching position upon energization of magnet 193 which attracts its armature 194 secured to rod 195 upon which the bail 192 is also secured. A spring 196 serves to hold the bail in normal position.

Referring to Fig. 14 each magnet 193 of which five are shown has in series therewith a switch 197 and a cam contact 198 controlled from punch shaft 84 is adapted to close toward the end of the cycle of punch operation to complete a circuit through such magnets 193 as have their switches 197 closed. The circuit is traced as follows: line 39, wire 199, switch 197, magct 193, contact 198, wire 62 to line 40. With the switch 197 open, the corresponding commutator mechanism is not restored and the data contained therein is undisturbed so that in each successive cycle of the punch, this information will be read from the reading-out commutator to the punch column to which it is plug connected.

In Fig. 14 are shown diagrammatically five commutator units each having its four magnets 165 connected to contacts 164 controlled by a magnet 159. The contacts 164 of all units are connected to the bars 166A—D which are common to all the units. The single set of keys 150 may thus operate any set of magnets 165. Associated with each unit are switches 160, 160a, 160b, a relay 168 and a lamp 204. The five associated readout commutators 170 are shown separately, adjacent to the punch selecting magnets 136 of which five are also shown. It will, of course, be understood that there are forty-five units in the machine and that but five have been shown in Fig. 14 to avoid repetition of similar parts.

*Column skipping*

Figure 7:
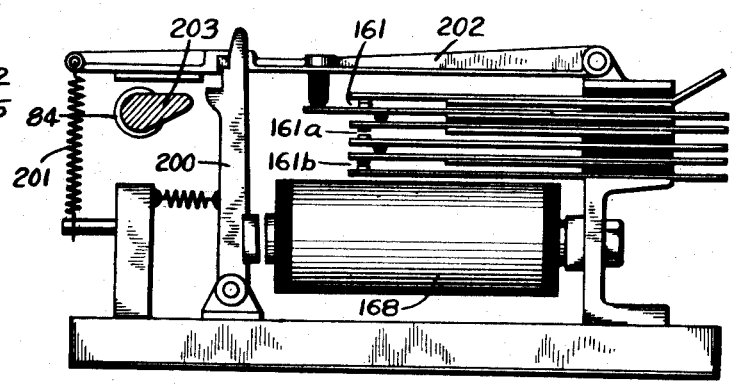
Fig. 7 is a detail of a relay.

Depression of any key 150 will cause the value represented by that key to be entered into the highest denominational order of the commutator device in the manner described. Provision is made whereby columns may be skipped at will, singly or in groups by simple switching means comprising, in Fig. 14, a triple switch composed of switches 160, 160a and 160b shown separately for the sake of clearness. Columns in which it is desired to enter data will have their switches 160, 160a, 160b moved to the positions shown in the first, second, and last columns. Those which are to be skipped will be moved to the position shown in the third and fourth columns from the left. The aforedescribed relays 168 (see also Fig. 7) of which there is one in each columnar circuit, are each adapted to control a set of contacts 161, 161a and 161b normally positioned as shown. Energization of relay 168 will attract its armature latch 200 and permit a spring 201 to draw downwardly on lever 202 to shift the contacts to their alternate positions, where they will remain until shaft 84 is rotated whereupon a cam 203 secured thereto will restore lever 202 to its upper position.

With switches 160, 160a, 160b in position as in Fig. 14 depression of any key 150 will momentarily close contact 156 completing the circuit from line 39, contact 156, wire 158, coil 159 in the extreme left position, switch 160, contact 161, wires 162 and 62 to line 40. It will be observed that this is the only circuit possible since contact 161a is open. The subsequent energization of relay coil 168 as already explained will open its contact 161 and close contacts 161a and 161b. Closure of 161b causes a signal lamp 204 to be illuminated to indicate that the column to which it corresponds has an entry or is to be skipped without receiving an entry. The circuit is as follows: from line 39, wire 205, contact 161b, lamp 204, wires 206 and 62 to line 40. A second key depression will energize the second solenoid 159 from the left through contact 156, first contact 161a, second solenoid 159, second switch 160 and contact 161 to other side of line.

Since the third and fourth columns as explained above are in position to be skipped, a third key depression will complete the circuit from line 39, contact 156, first and second contacts 161a, third and fourth switches 160a, fifth solenoid 159, fifth switch 160 and contact 161 to line 40 as before. Prior to this third key depression the first, second, third and fourth lamps 204 were illuminated due to the positions of their contacts 161b or switches 160b. This indicates to the operator that the next unlighted column, namely the fifth will receive the key controlled data. It will be noted that at any instant there will be but a single column in readiness to receive an entry and a particular column will not become active until all higher denominational orders have either received an entry or have been positioned for skipping. It will be understood, however, that the system of interlocking switches and relay contacts may readily be reversed so that entries are made from right to left, that is, an entry may begin with the lowest order and progress upwardly in the same manner as described for the reverse condition.

Depression of key 210 (Fig. 14) will complete a circuit through magnets 56 and 187, provided switch 188 is closed, as follows: from line 39, contacts 57, motor PM, magnet 56, contacts 210a, wire 62 to line 40. A parallel circuit also extends from line 39, switch 188, magnet 187, contacts 210a, wire 62 to line 40. Motor PM, being simultaneously started, will cause a cycle of operations of the punching mechanism and the storage commutator mechanism during which the key set amounts will control the position of the selector bars. After the card is punched the commutator mechanism set up may be restored or permitted to retain the entries accordingly as the switches 197 are closed or open at such time. If all are open, prolonged depression or successive depressions of key 210 will cause successively fed cards to receive the same information from the commutator mechanism. A switch 211 is provided which, when closed, will cause continued operation of the punch for successive gang punching operations.

The operation of the machine will now be reviewed with particular reference to a specific problem. Let it be supposed that the numbers 1, 3, 9, and 7 are to be entered into the first four columns, respectively, of the record card; that the next sixteen columns are to be left blank, and that the numbers 6, 4, and 2 are to be punched in the succeeding three columns respectively and let it be further supposed that the numbers 6, 4, and 2 are to be retained in the setup devices of the machine for controlling punching of this number in the same columns of subsequently fed cards. It will be necessary to first position the various switches in accordance with the following table:

| Card columns | 1 2 3 4 | (5 ... 20) | 21 22 23 |
|---|---|---|---|
| Data to be entered | 1 3 9 7 | Blank | 6 4 2 |
| Switches 160 | Closed | Open | Closed |
| Switches 160a, 160b | Open | Closed | Open |
| Switches 197 | Closed | | Open |

After the switches have been set as indicated, the operator is ready to enter the numbers into the commutator setup devices. The only movement of parts involved in setting up the several commutator devices is the lateral shifting of brushes 175 and the brushes in each order will be set in succession. In accordance with the specific problem chosen, the operator will first depress the "1" key 150 which will close its contacts 152 and circuits traceable as explained in detail above and in accordance with the code arrangement of Fig. 8 will cause the shifting of the A brush of the commutator unit associated with the first column and will at the same time cause illumination of lamp 204 of the first column. The incidental energization of the first relay 168 will cause closure of related contacts 161a and opening of contacts 161, the latter preventing further entry into the unit just set up. The operator next depresses the "3" key 150 which in accordance with the code will cause shifting of the A and C brushes 175 of the second unit. Subsequent successive depression of the "9" and "7" keys will shift the C and D brushes 175 in the third column and the A and B brushes in the fourth column.

Due to the setting of the switches in the columns 5 to 20, inclusive, as indicated in the above table, the next following key depression will select the twenty-first column to receive the next entry. Thus, depression of the "6" key 150 will cause shifting of the A and D brushes 175 associated with the twenty-first column and the following successive depression of the "4" and "2" keys will set the brushes in the twenty-second and twenty-third columns to represent these values. At this point, the first four units associated with the first four card columns have their brushes set to represent 1397 and the units associated with the twenty-first, twenty-second and twenty-third columns have their brushes 175 set to represent 642. The operator will now initiate a single cycle of operation of the punching machine proper and during this single cycle, the commutators 170 will make one revolution during which circuits will be completed at differential times in accordance with the setting of the brushes 175 in the several units to interrupt the upward movement of the punch selecting bars. After all the bars are positioned, the punching bail will advance to concurrently perforate the several columns.

Toward the end of the cycle the commutator units associated with the first four columns will be reset; that is, their brushes 175 will be re-latched in inoperative position since in these columns the switches 197 have previously been closed, permitting energization of the restoring magnets 193. In the twenty-first to twenty-third column positions, however, the switches 197 are open and the settings originally made of the brushes of these units will remain in their shifted positions. At the end of this single cycle of punching operations, the operator may again, by successive key depressions, enter a new number in the first four columns and send the machine through another card punching cycle to perforate a second card with the information in the commutator units. It is to be noted that the setting of the twenty-first to twenty-third columns will be retained indefinitely and not be reset until after their respective switches 197 have been closed. If it is desired to punch a number of cards with the same information, let us say for example, 642 in columns 21 to 23, the brushes in these columns will be adjusted as explained above and the operator will close switch 211. The machine will then perform successive cycles of punching operation until the switch is again opened and during each cycle a card will be perforated 642 in columns 21 to 23.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is as follows:

1. In a card perforating machine having punches and selectors therefor, a plurality of keys, a plurality of denominational order storage devices and means for successively selecting said devices to receive data entries in accordance with successive key depressions, and means controlled by said devices for emitting timed electric impulses to differentially position said selectors.

2. In a card perforating machine, the combination with punches and selectors therefor, of means for moving said selectors to differential positions, a key-set storage device, means controlled by said device for emitting timed electric impulses, and means adapted to cause positioning of said selectors under control of said impulses, to select punches in accordance with data key-set in said device.

3. In a card perforating machine, the combination with punches one for each index position of a card, of a punch selector, means for moving said selector successively past said punches, means for interrupting the movement of said selector to select one of said punches for operation, a multi-denominational key set storage device adapted to receive data, means for operating said device in synchronism with the movement of said selector, and means controlled by said device for operating said selector interrupting means.

4. In a punching machine having punching mechanism including a plurality of punches, means for selecting a plurality of said punches for punching operations, said means including a plurality of denominational order storage commutators and cooperating brushes adapted to receive data successively, keys for causing a set-up of data on said commutators and brushes and means for operating said commutators and punch selecting means in synchronism whereby said punches are selected during a single revolution of said commutators in accordance with the data set thereon.

5. In a punching machine having punching mechanism, a key-set commutator device adapted to receive data, means for feeding blank cards one by one to said punching mechanism, said punching mechanism being so controlled by said commutator device as to duplicate in each blank card the data set up therein by said keys.

6. The invention set forth in claim 5 in which the commutator device comprises a plurality of denominational order commutators and relatively displaceable associated brushes adapted to receive entries in successive order.

7. A punching machine controlled by data receiving commutator devices, comprising in combination, means for entering data in said devices in succession, means to feed blank cards to punching position, punching mechanism including selectable punches, means including electric circuits, controlled by said commutator devices for selecting punches while a blank card is being fed to position and means for subsequently actuating said punching mechanism.

8. In a machine of the class described, in combination, electric commutator devices comprising key set item receiving orders, a plurality of punches, a plurality of punch selector bars each cooperating with a plurality of punches and a controlling magnet for each selector bar, said magnets being controlled by said commutator devices.

9. The invention set forth in claim 8 in which said commutator devices comprise a plurality of denominational order key-set commutators, adapted to receive data successively and including electric column skipping mechanism whereby one or more denominational orders may be automatically skipped during a setting operation.

10. A punching machine comprising a row of punches and a common selector member therefor, means for effecting relative movement between said punches and said member and controlling means comprising key-set commutators for translating key operations into differential equivalents and mechanism for interrupting the relative movement in accordance with the differential equivalents to select corresponding punches.

11. In a key-set punching machine, a plurality of columns of denominational order commutators, means for selecting said commutators in succession to receive data in accordance with successive key operations said selecting means being adapted to skip a predetermined column or columns, means for indicating which columns have been set or skipped and means controlled by said commutators for controlling the punching machine.

12. In a key controlled card perforating machine, a plurality of keys, reading-in means controlled by said keys and consisting of a plurality of commutator brushes shiftable in combination according to the value of the operated key, punches, selectors therefor, reading-out means for controlling said selectors, said reading-out means comprising a commutator having a plurality of differentially spaced contacts on its surface.

13. In a key controlled card perforating machine, punching mechanism, a controlling commutator having contacts on its periphery, cooperating contact wipers, item keys, and means under control of said keys for shifting said wipers along the commutator periphery in different combinations to coact with said contacts to effect a differentially timed electrical impulse to the punching mechanism at a certain position of the commutator.

14. In a card punching machine, keys, a data receiving and retaining mechanism, including a plurality of settable elements, means under control of said keys for rendering said elements settable in combinations, means for interpreting the setting of said elements as a single timed electrical impulse, and a differentially positionable punch selector controlled by the transmitted electrical impulse for positioning the same.

15. In a machine of the class described, a plurality of ordered sets of positionable elements, a plurality of keys, means controlled by said keys for effecting a combinational setting of one of said orders for each key operation, means for preselecting certain orders for skipping whereby such will be automatically skipped during setting operations, punching mechanism and means for concurrently reading out the data set in said orders to control the operation of said punching mechanism.

16. In a machine of the class described, a plurality of ordered sets of positionable elements, punching mechanism controlled thereby, means for effecting a setting of each order in succession, means for resetting said orders, and means settable to prevent resetting of predetermined orders whereby the entries made therein will be retained.

17. In a machine of the class described, a plurality of ordered sets of positionable elements, punching mechanism controlled thereby, means for effecting a presetting of items in certain orders, keys, means controlled by said key for setting said orders in succession and means controlled by each order as it is set for selecting the next available order to receive an entry whereby any preset orders will be automatically skipped.

18. The invention set forth in claim 17 in which means is provided to indicate the orders in which presetting has been effected.

19. In a machine of the class described, a plurality of ordered sets of positionable elements, punching mechanism controlled thereby, means for preselecting certain orders for skipping and for indicating the same, keys and means controlled thereby for effecting setting of the non-skipped orders in succession upon successive key operations.

JAMES W. BRYCE.